(12) United States Patent
Terrien et al.

(10) Patent No.: US 12,393,193 B2
(45) Date of Patent: Aug. 19, 2025

(54) OMNIDIRECTIONAL LINE FOLLOWING AUTONOMOUS VEHICLE

(71) Applicant: BlueBotics SA, St-Sulpice/VD (CH)

(72) Inventors: Grégoire Terrien, Ecublens (CH); Pierre Lamon, Epalinges (CH); Nicola Tomatis, Clarmont (CH)

(73) Assignee: BlueBotics SA, St-Sulpice/VD (CH)

(*) Notice: Subject to any disclaimer, the term of this patent is extended or adjusted under 35 U.S.C. 154(b) by 0 days.

(21) Appl. No.: 17/754,824

(22) PCT Filed: Oct. 15, 2020

(86) PCT No.: PCT/IB2020/059704
§ 371 (c)(1),
(2) Date: Apr. 13, 2022

(87) PCT Pub. No.: WO2021/074843
PCT Pub. Date: Apr. 22, 2021

(65) Prior Publication Data
US 2024/0103515 A1     Mar. 28, 2024

(30) Foreign Application Priority Data
Oct. 18, 2019 (CH) .................................... 01324/19

(51) Int. Cl.
*G05D 1/00*     (2024.01)
*B62D 15/02*    (2006.01)

(52) U.S. Cl.
CPC ......... *G05D 1/0212* (2013.01); *B62D 15/025* (2013.01)

(58) Field of Classification Search
CPC ........................... G05D 1/0212; B62D 15/025
See application file for complete search history.

(56) References Cited

U.S. PATENT DOCUMENTS

| | | | |
|---|---|---|---|
| 2010/0106356 A1 | 4/2010 | Trepagnier et al. | |
| 2013/0131910 A1 | 5/2013 | Takahashi et al. | |
| 2019/0079537 A1 | 3/2019 | Yoshida et al. | |
| 2021/0174547 A1* | 6/2021 | Park | G08G 5/003 |

FOREIGN PATENT DOCUMENTS

| | | | | |
|---|---|---|---|---|
| CN | 108628324 A | * | 10/2018 | ........... G05D 1/0212 |
| JP | H10198425 A | | 7/1998 | |
| JP | 2008026928 A | | 2/2008 | |
| JP | 2012216129 A | | 11/2012 | |
| JP | 2017227943 A | | 12/2017 | |
| KR | 20200086431 A | * | 7/2020 | ........... G05D 1/0212 |
| WO | 2017050357 A1 | | 3/2017 | |
| WO | 2017158973 A1 | | 9/2017 | |

(Continued)

OTHER PUBLICATIONS

English Translation JPH10198425A (Year: 2024).*

(Continued)

*Primary Examiner* — Rami Khatib
(74) *Attorney, Agent, or Firm* — McDonald Hopkins LLC

(57) ABSTRACT

A process of piloting an omnidirectional autonomous vehicle on a virtual pathway, the omnidirectional autonomous vehicle including at least one reference line, and steering wheels configurable to drive the omnidirectional autonomous vehicle on the virtual pathway independently of its orientation.

11 Claims, 4 Drawing Sheets

(56) References Cited

FOREIGN PATENT DOCUMENTS

WO     WO-2021069292 A1 * 4/2021 ........... B60B 19/003

OTHER PUBLICATIONS

International Search Report for PCT/IB2020/059704 dated Dec. 14, 2020.
Written Opinion for PCT/IB2020/059704 dated Dec. 14, 2020.
Tai, Meihua et al, "Nonlinear robust loop shaping controller design for automated lane guidance of heavy vehicles", Proceedings of the American Control Conference, Jun. 28-30, 2000, p. 2028-2032, vol. 3, Piscataway, NJ, USA, IEEE, XP010518264.
Regolin, Enrico et al, "A Sliding-Mode Virtual Sensor for Wheel Forces Estimation With Accuracy Enhancement via EKF", Apr. 1, 2019, vol. 68, No. 4, p. 3457-3471, XP011719737.

* cited by examiner

OMNIDIRECTIONAL LINE FOLLOWING AUTONOMOUS VEHICLE

FIELD OF THE INVENTION

The present invention concerns an omnidirectional autonomous vehicle as well as a process for piloting such omnidirectional autonomous vehicle on a virtual pathway.

DESCRIPTION OF RELATED ART

Autonomous robotized vehicles are widely used in industrial environments, including warehouses, factories, hospitals, nuclear plants and mines. They are of particular support for the human activities regarding the handling of objects and in particular their transportation from one location to another one.

Such vehicles are usually provided with sensors of various types, which allow them to move in an autonomous manner through the working space. Predetermined paths are usually required for the known autonomous vehicles to efficiently perform their tasks. Such predetermined paths include for example lines drawn on the floor, or virtual lines, as described for example in WO2017050357. In this approach, the vehicle constantly determines its offset from the path line to follow and corrects its direction accordingly to remain in line with the path.

Omnidirectional vehicles are also known, which are able to take any possible orientation. Such vehicles are of increasing interest.

There is thus an increasing need to improve the flexibility and the functionalities of the autonomous vehicles.

BRIEF SUMMARY OF THE INVENTION

It is an object of the present invention to provide a process of piloting an omnidirectional autonomous vehicle in a workspace. In particular, it is an object of the present invention to provide flexibility in the piloting of such omnidirectional vehicle.

It is a further object to provide a process for retrofitting existing omnidirectional vehicles so as to have improved piloting abilities.

It is also an object of the present invention to provide an omnidirectional vehicle having flexible piloting capabilities.

According to the invention, these aims are achieved by means of the claimed solution.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
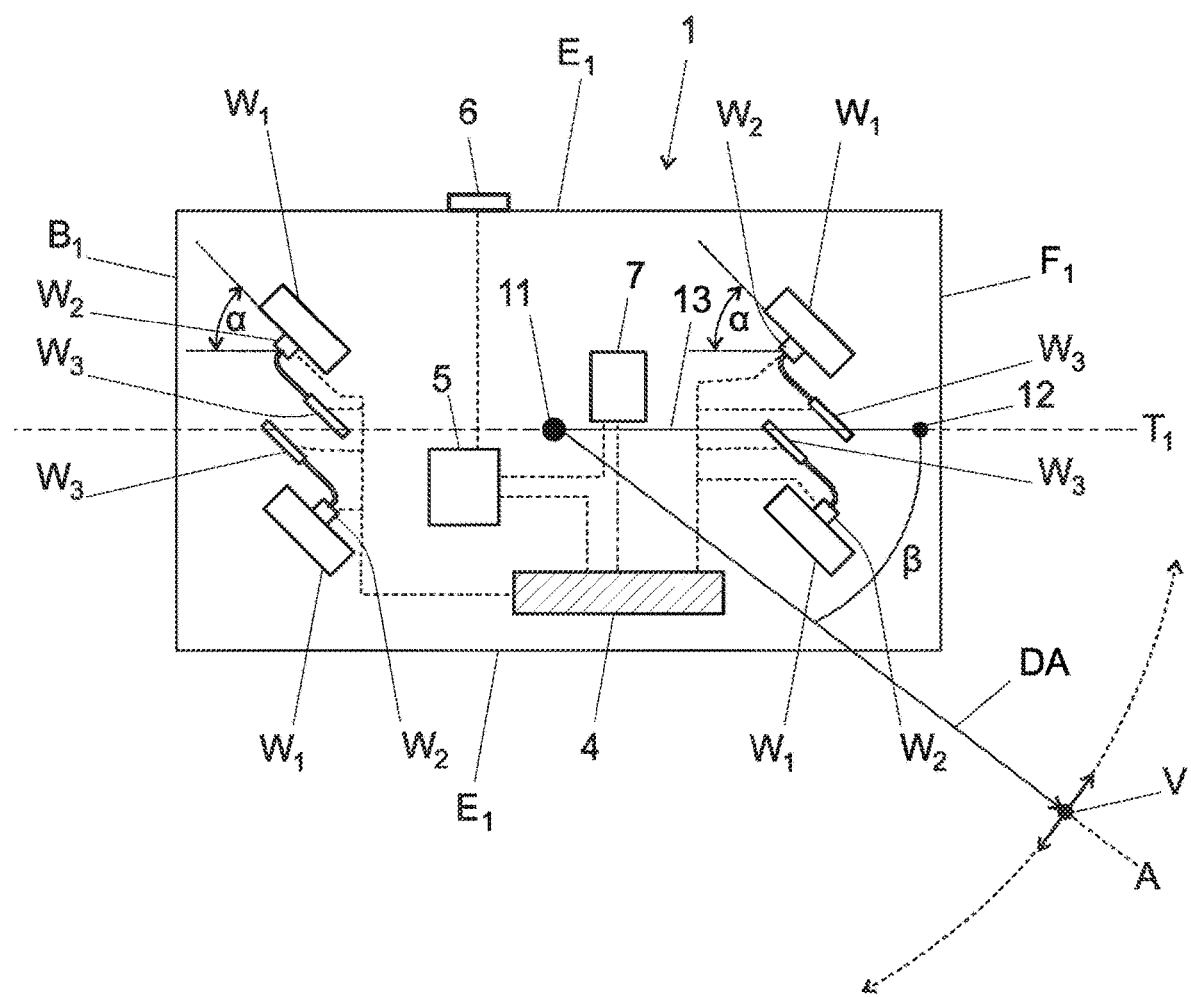
FIG. 1: Schematic bottom view of the omnidirectional vehicle 1.

An omnidirectional vehicle 1 denotes any vehicle, the wheels of which can be configured to drive the omnidirectional vehicle 1 in any direction, with any orientation. In particular, such an omnidirectional vehicle 1 may comprise a front side F1, a back side B1 and edges E1, and have a longitudinal axis T1 joining the backside B1 to the front side F1. Although the front side F1 is usually directed to the targeted position for a traditional vehicle, any other side of an omnidirectional vehicle 1, including the edges E1, at any possible angle, can face the position to be reached by the omnidirectional vehicle. The movement of an omnidirectional vehicle 1 is thus defined by the combination of a speed vector, a longitudinal vector, a lateral vector, and a rotational vector.

Although the omnidirectional vehicle 1 is described here with its traditional front side F1, backside B and edges E1, it should be understood that such an omnidirectional vehicle 1 may have various shapes, including square or circular shapes, wherein the backside B1, front side F1 and edges E1 cannot be distinguished by eyes. The omnidirectional vehicle 1 comprises at least one reference point 12, which can be any physical point or any virtual point of the omnidirectional vehicle 1. The referenced point 12 may for example be placed on the longitudinal axis T1 at a position close to the front side F1 of the omnidirectional vehicle 1. In case no longitudinal axis T1 can be determined, the reference point 12 may be defined at any other position within the omnidirectional vehicle 1. Such reference point 12 can be considered as the front side F1 of the omnidirectional vehicle 1 in case no visual front side F1 can be determined.

Independently to its shape, the omnidirectional vehicle 1 comprises a vehicle centre 11. The vehicle centre 11 may be a physically materialised point or a virtual point or both a virtual point which is also materialised by a physical element. The vehicle centre 11 preferably corresponds to the geometric centre of the omnidirectional vehicle 1. In other words in corresponds to a point around which the omnidirectional vehicle 1 can rotate by describing a circle having the minimal possible diameter. The vehicle centre 11 may have however a different position, even though a different position may not be optimal for the agility of the omnidirectional vehicle 1.

The reference point 12 and the vehicle centre 11 together define a reference line 13. Such reference line 13 may coincide with the longitudinal axis T1 of the omnidirectional vehicle 1 if it can be determined. Alternatively, the reference line 13 may define a virtual axis of the omnidirectional vehicle 1.

The orientation of the omnidirectional vehicle 1 is determined based on its reference line 13 and a virtual sensor V, the position of which can be adjusted with regard to the vehicle centre 11. In particular, the virtual sensor V can be adjusted with regard to the reference line 13 of the omnidirectional vehicle 1. The adjusted position of the virtual sensor V defines with the vehicle centre 11 a travelling direction DA. Such travelling direction DA determines a rotation angle β with the reference line 13. When the rotation angle β equals zero, the virtual sensor V is aligned with the reference line 13 of the omnidirectional vehicle 1. The rotation angle β can take any value comprised between 0 and 90°, or between 0 and 180°, or between 0 and 306°. It can also take positive or negative values.

The omnidirectional vehicle 1 also comprises wheels which can be configured to drive the omnidirectional vehicle 1 to any direction, with any vehicle orientation. According to a possible arrangement shown in FIG. 1, some or all of the wheels are steering wheels W1, which can be independently oriented with regard to the reference line 13 of the omnidirectional vehicle 1 by a steering angle α. The value of the steering angle α may be comprised between 0° and 90° or 0° and 180° or 0° and 360°. The wheels W1 may be independently steered in one or the other direction with regard to the reference line 13. At least two wheels of the omnidirectional vehicle 1 are driving and steering wheels. The steering wheels W1 are thus motorised with at least one driving motor W2, to drive the omnidirectional vehicle 1. They may be in addition oriented by the mean of an individual steering actuator W3. The number of wheels is however not limited. The configuration shown in FIG. 1 is provided as an example and is not the sole possible arrangement regarding the wheels of the omnidirectional. For instance, omni wheels or poly wheels, such as those known as the kiwi drive can also be used. The term "steering wheel W1" is thus referring to any wheel adapted to drive the omnidirectional vehicle 1 in a given direction independently of its spatial orientation. A steering wheel W1 can thus be configured according to the path and the orientation of the omnidirectional vehicle 1. The omnidirectional vehicle 1 can of course comprise steering wheels W1 and other type of wheels such as an idler. The omnidirectional vehicle 1 comprises at least two steering wheels W1. The number of steering wheels W1 is however not limited, and may be 3 or 4 or 6 or 8 or more.

The steering wheels W1 of the omnidirectional vehicle 1 are connected to a driving unit 4 of the omnidirectional vehicle 1 which is adapted to pilot the steering wheels W1 according to the path the omnidirectional vehicle 1 needs to follow.

The omnidirectional vehicle 1 comprises also a positioning unit 5, adapted to determine its position, within a given workspace 2. The positioning unit 5 is connected to at least one sensor 6 placed on the omnidirectional vehicle 1, preferably to a plurality of sensors 6. Such sensors 6 may be of any type. It can be for example selected among lasers based sensors, including 360° laser scanners, radars, optical 3D scanners, tactile sensors, radio receivers, cameras including stereoscopic camera, ultrasound based sensor, infrared based sensor, or a combination of several type of sensors. The positioning unit 5 is in addition adapted to determine the orientation of the omnidirectional vehicle 1.

The position of the omnidirectional vehicle 1 denotes its position within the workspace 2 without considering its orientation. The position can be for example defined by geolocation with regard to a predetermined map or with regard to reference points of the workspace 2 or a combination of geolocation with regard to a predetermined map and with regard to reference points of the workspace 2. The position of the omnidirectional vehicle 1 can be determined in a two dimension space or in a three dimension space. The position of the omnidirectional vehicle 1 can be determined with regard to a single point, such as the vehicle centre 11 or another point of the omnidirectional vehicle 1. The reference points of the workspace 2 are for example recognized by the mean of one or more sensors 6 of the omnidirectional vehicle 1.

The orientation of the omnidirectional vehicle 1 denotes its spatial orientation with regard to its environment, including a path the omnidirectional vehicle 1 is following. The orientation of the omnidirectional vehicle 1 is thus preferably determined based on at least two different points of the omnidirectional vehicle 1, such as the reference point 12 and the vehicle centre 11. Other points of the omnidirectional vehicle 1 can be considered alternatively or in addition. The orientation of the omnidirectional vehicle 1 can be defined with regard to a given path the omnidirectional vehicle 1 follows, or with regard to one or several reference points of the workspace 2, or with regard to a combination of a given path and one or several reference points of the workspace 2. The orientation of the omnidirectional vehicle 1 can be determined in a two dimension space or in a three dimension space.

The omnidirectional vehicle 1 further comprises a path following unit 7 connected to the drive unit 4 and to the positioning unit 5. The path following unit 7 stores predetermined pathways and send the necessary signals to the driving unit 4, based on the information received from the positioning unit 5 to drive the omnidirectional vehicle 1 along a predetermined pathway. A predetermined pathway stored in the path following unit 7 may comprise a combination of several virtual paths or parts of virtual paths. The path following unit 7 generates a virtual sensor V indicating the direction DA on a virtual path A the omnidirectional vehicle 1 should follow. The path following unit 7 also monitors the angular position of the virtual sensor V with regard to the reference line 13 of the omnidirectional vehicle 1. Thus, the orientation and the travelling of the omnidirectional vehicle 1 is dynamically controlled.

The trajectory of the vehicle 1 along said virtual path A is dynamically controlled and monitored by the mean of at least one sensor 6, connected to the positioning unit 5. Potential offsets with regard to the virtual path A can thus be detected by the positioning unit 5 and necessary signals are sent to the driving unit 4 which pilots one or more steering wheels W1 accordingly to minimize the offset and maintain the omnidirectional vehicle 1 in line with the virtual path A.

The orientation of the omnidirectional vehicle along the path A is also dynamically monitored by the mean of at least one sensor 6, preferably several sensors 6. The orientation of the omnidirectional vehicle 1 may be determined with regard to the path A the omnidirectional vehicle 1 should follow. The rotation angle β between the travelling direction DA and the reference line 13 of the path A is thus predetermined so as to be constant during the traveling of the omnidirectional vehicle 1. The sensor or the plurality of sensors 6 used to monitor the orientation of the omnidirectional vehicle 1, together with the positioning unit 5 and the path following unit 7, are able to determine potential angular offsets with regards to the rotation angle β. Necessary signals can then be sent to the driving unit 4 which pilots one or more steering wheels W1 accordingly to minimize the angular offset and maintain the orientation of the omnidirectional vehicle 1. The driving mode of the omnidirectional vehicle thus corresponds to a set relative angle mode. When the path A is not strait, the orientation of the omnidirectional vehicle 1 can easily follow the path A and so as to keep the same angular position with regard to the path A.

The set relative angle mode may be defined for the entire pathway of the omnidirectional vehicle 1 or only for parts of the pathway.

Figure 2A:
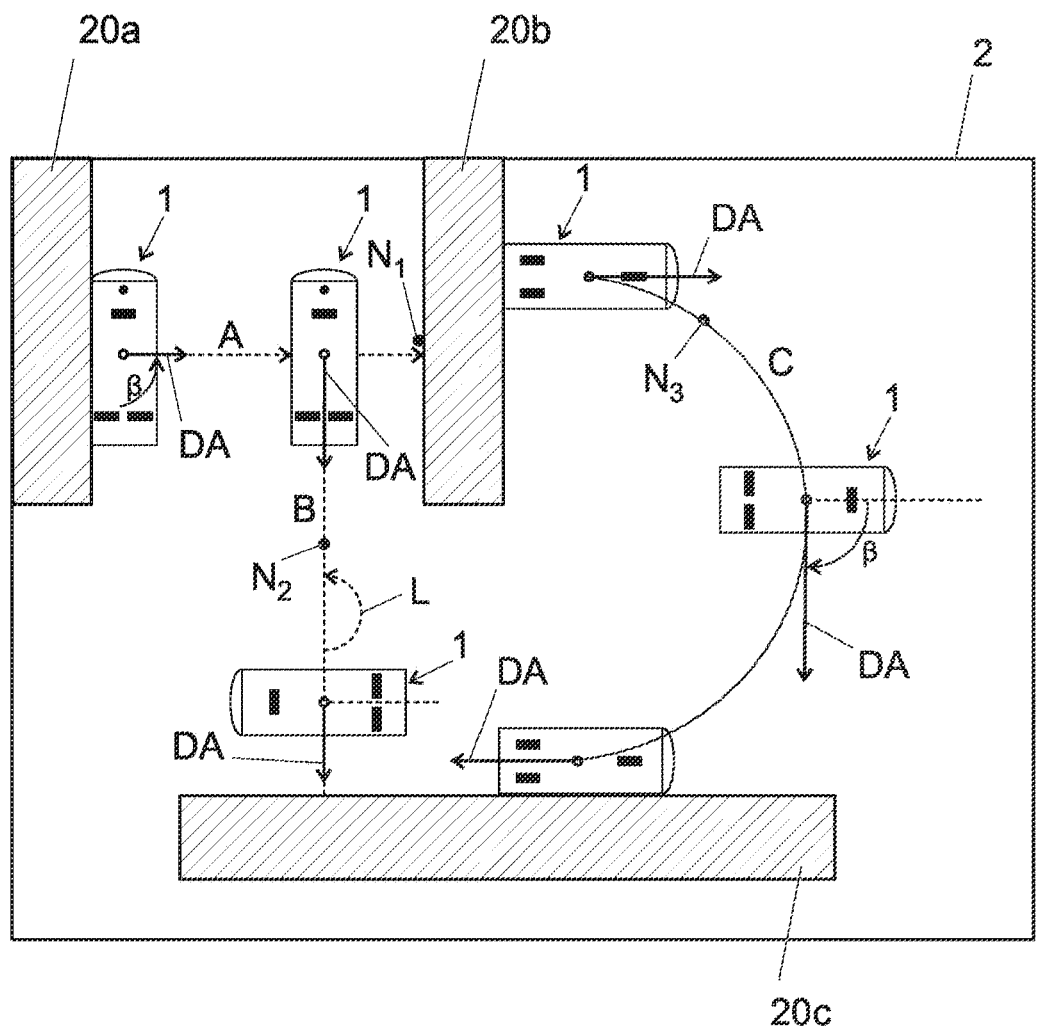
FIG. 2*a*: examples of paths and orientations of an omnidirectional vehicle 1 within a workspace 2.

The orientation of the omnidirectional vehicle 1 along the path A may alternatively be determined with regard to the environment of the omnidirectional vehicle 1, independently of the path it follows. The environment may be the workspace 2 including the various elements 20 it comprises (FIG. 2a). The rotation angle β between the travelling direction DA and the reference line 13 is thus dynamically adapted so as to maintain the orientation within the workspace 2 of the omnidirectional vehicle 1 during its traveling along a given path. The sensors 6 used to monitor the orientation of the omnidirectional vehicle 1, together with the positioning unit 5 and the path following unit 7, are able to determine potential angular offsets with regards to the rotation angle β.

Necessary signals can then be sent to the driving unit 4 which pilots one or more steering wheels W1 accordingly to minimize the angular offset and maintain the orientation of the omnidirectional vehicle 1 within the workspace. The driving mode of the omnidirectional vehicle thus corresponds to a lock heading mode. When the path is not strait, the orientation of the omnidirectional vehicle 1 remains constant with regard to the environment while the omnidirectional vehicle 1 follows the path. Its angular position with regard to the path is thus dynamically adapted accordingly.

The lock heading mode may be defined for the entire pathway of the omnidirectional vehicle 1 or only for parts of the pathway.

The set relative angular mode and the lock heading mode are mutually exclusive.

It should be noted that during the traveling of the omnidirectional vehicle 1 along a predetermined path A, the rotation angle $\beta$ between the travelling direction DA and the reference line 13 of the omnidirectional vehicle 1 may be independently controlled and adjusted. For example, while the omnidirectional vehicle 1 follows the path A, the rotation angle $\beta$ may be changed from a first value to a second value in such a way to adjust the orientation of the omnidirectional vehicle 1 for the rest of the path A or for a portion of the rest of the path A. The rotation of the omnidirectional vehicle 1 may be for example of angle of 10°, or 45° or 90° or 180°. This is particularly convenient when the omnidirectional vehicle 1 needs to change its orientation from the start to the arrival of the pathway without stopping to make the corresponding manoeuvres.

It can alternatively be decided that the omnidirectional vehicle 1 stops travelling along its path A, in such a way that its orientation can be adjusted from a first orientation to a second orientation, and then its travelling is resumed while it maintains its second orientation.

The independent adjustment of the rotation angle $\theta$ can be performed either under a lock heading mode or under a set relative angle mode. Alternatively, the current driving mode can be deactivated to allow the independent adjustment of the rotation angle $\beta$, and activated afterwards, once the second orientation is determined.

Figure 2B:
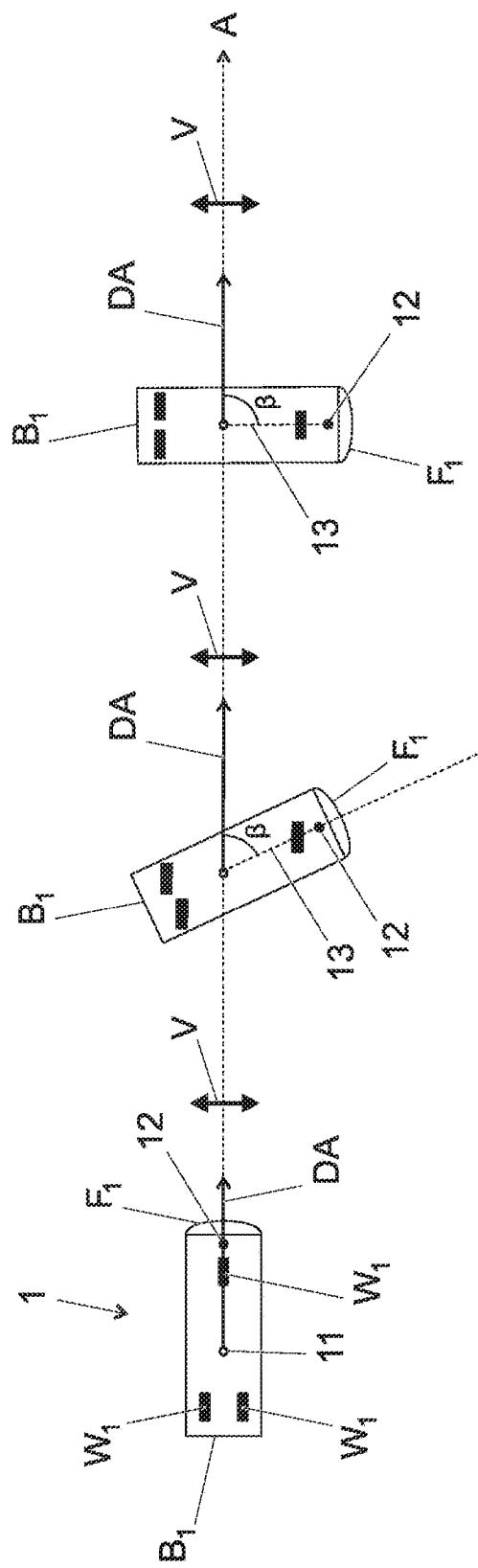
FIG. 2*b*: Details regarding the rotational displacement of the omnidirectional vehicle 1 along a given path.

The omnidirectional vehicle 1 can thus follow a given pathway with any possible orientation (FIGS. 2*a*, 2*b*). For example, the omnidirectional vehicle 1 may be dedicated to loading and unloading activities from several shelves of the workspace 2. It can start from shelves 20*a* having a transversal orientation, wherein the rotation angle $\beta$ is defined to be 90°, and follow the path A, either under a lock heading mode or under a set relative angle mode. It arrives at the shelves 20*b* with the same orientation. This avoids rotational move of the omnidirectional vehicle 1 to orient itself in the direction of the path A, as it should be with a traditional vehicle. A second path B, from second shelves 20*b* to third shelves 20*c* may request that the orientation of the omnidirectional vehicle 1 is adapted to the configuration of the third shelves 20*c*. The omnidirectional vehicle 1 can start from the second shelves 20*b* with its original orientation. The rotation angle $\beta$ has however been adapted to direct the travelling direction DA in line with the second path B while the omnidirectional vehicle 1 had stopped to the second shelves 20*b*. In addition, the steering wheels W1 have been configured to drive the omnidirectional vehicle 1 along the second path B. The rotational angle $\beta$ then equals zero. Such process allows to benefits from the stops of the omnidirectional vehicle 1 for configuring new paths or new orientations, then saving time.

It should be noted that when stopped at the second shelves 20*b*, the omnidirectional vehicle 1 is configured to change its pathway from a first path A to a second path B. However, the same process applies if the omnidirectional vehicle 1 needs to change its orientation while remaining on the path A. In that case, the rotation angle $\beta$ is adjusted to direct the travelling direction DA in line with the same path A, defining a new orientation for the omnidirectional vehicle 1, and the steering wheels W1 are configured to drive the omnidirectional vehicle 1 along said path A with its new orientation.

The omnidirectional vehicle 1 may be guided along the second path B under the lock heading mode or under the set relative angle mode. While travelling along the second path B, a rotation of the omnidirectional vehicle 1 can be initiated by independently and progressively adjusting the rotation angle $\beta$ from the initial value of 0° to the requested value of 90°. The omnidirectional vehicle 1 then follows its pathway until it arrives at the targeted third shelves 20*c* with the proper orientation. Any other rotation angle $\beta$ could have been selected, depending on the targeted orientation of the omnidirectional vehicle 1.

Alternatively, the omnidirectional vehicle 1 may follow the curved pathway C from the second shelves 20*b* to the third shelves 20*c*. In such a way to arrive at the third shelves 20*c* with the proper orientation, it may progress along the curved line C under the lock heading mode described above. The rotation angle $\beta$ is thus dynamically monitored and adjusted so as to maintain the orientation of the omnidirectional vehicle 1 with regard to the environmental workspace 2, along the curved path C.

One or several predetermined operation positions N1, N2, N3 may be arranged on the pathway to instruct the omnidirectional vehicle 1 to operate some specific operation. For example an operation position N1 can be provided at the second shelves 20*b* to instruct the omnidirectional vehicle 1 to adjust the rotation angle $\beta$ from its initial value of 90° to a second value of 0°, and to configure the steering wheels W1 so as to drive the omnidirectional vehicle 1 along the second path B. On the second path B, a second operation position N2 may instruct the omnidirectional vehicle 1 to start a rotation by progressively adjusting the rotation angle $\beta$ from its initial value of 0° to a second value of 90°. A third operation position N3 can be placed at the start of the second shelves 20*b* on the curved path C to instruct the omnidirectional vehicle 1 to travel according to the head locking mode until the third shelves 20*c*. These operation position N preferably denotes virtual predetermined positions.

The above examples are not limitative and any other instructions or combination of instructions related to the rotation angle $\beta$ and the configuration of the steering wheels W1 can be envisaged. In particular, the variation of the rotation angle $\beta$ may be positive or negative depending on the sense of rotational the omnidirectional vehicle 1 should follow. Alternatively, the rotation angle $\beta$ can be defined in one direction only over 360°.

Figure 3:
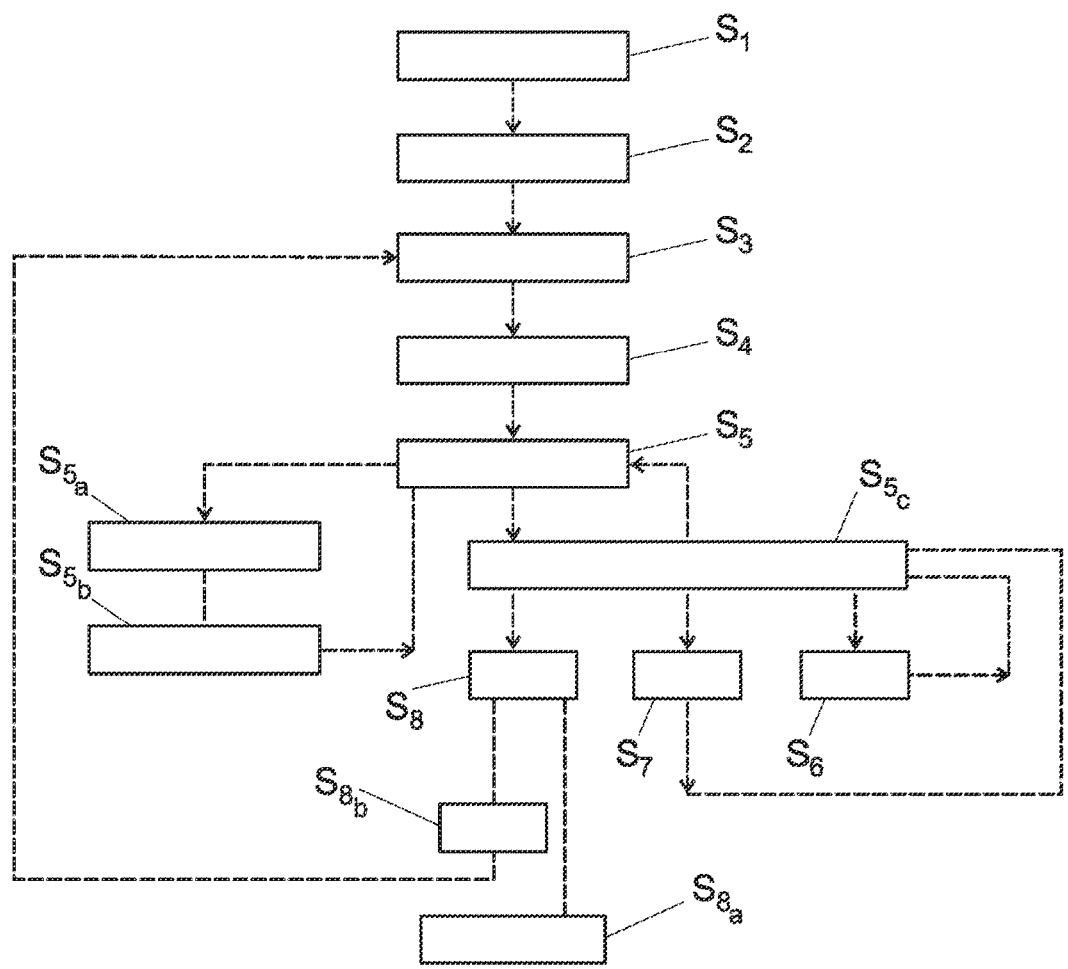
FIG. 3: Diagram of the process regarding the piloting of the omnidirectional vehicle 1.

The process of piloting an omnidirectional vehicle 1 according to the present invention is shown on FIG. 3. It comprises the step S1 of determining a virtual path A the omnidirectional vehicle 1 should follow. Such virtual path A is predetermined based on a map and potential reference points within the workspace 2.

It further comprises the step S2 of determining a virtual sensor V, the position of which being adjustable with regard to a reference point 12 of the omnidirectional vehicle 1.

It further comprises the step S3 of adjusting said virtual sensor V to provide a rotation angle $\beta$ with regard to a reference line 13 of the omnidirectional vehicle 1 so as to define a travelling direction DA, pointing to the path A.

It further comprises the step S4 of configuring the steering wheels W1 of the omnidirectional vehicle 1 so as to drive the omnidirectional vehicle 1 in the travelling direction DA.

It further comprise the step S5 of driving the omnidirectional vehicle 1 along the virtual path A, following the travelling direction DA.

The step S5 comprises the steps S5a of dynamically monitoring the position of the omnidirectional autonomous vehicle 1, determining potential offsets with regard to the virtual path A, and minimizing said potential offsets. The step S5 further comprises the step S5b of dynamically monitoring the orientation of the omnidirectional autonomous vehicle 1, determining potential angular offsets with regard to the requested rotational angle β, and minimizing said potential angular offsets.

The step S5 also comprises the step S5c of determining whether the orientation of the omnidirectional autonomous vehicle 1 should be correlated to the path A, under a set relative angle mode, correlated to the environmental workspace 2, under a lock heading mode, or should be independently controlled.

The step S5 also comprises the step S6 of initiating the lock heading mode, if it is decided in step S5c that the lock heading mode should be activated, by dynamically adjusting the position of the virtual sensor V so that the rotation angle β is adapted to maintain the orientation of the omnidirectional autonomous vehicle 1 with regard to the environmental workspace 2 constant.

The step S5 also comprises the step S7 of initiating the set relative angle mode, if it is decided in step S5c to activate the set relative angle mode, by maintaining the rotation angle β at a constant value along the path A in a way that the orientation of omnidirectional autonomous vehicle 1 with regard to the path A remains constant.

The step S5 further comprises the step S8 of independently adjusting the orientation of the omnidirectional vehicle 1, if it is decided in step S5c that the orientation of the omnidirectional autonomous vehicle 1 should be independently controlled. The step S8 comprises the step S8a of progressively adapting the rotation angle β from a first value to a second value. The steering wheels W1 of the omnidirectional vehicle 1 are meanwhile progressively configured to maintain the travelling of the omnidirectional vehicle 1 along the path A. The step S8 also comprises the step S8b of stopping the omnidirectional vehicle 1 and then applying the steps S3, S4 and S5, wherein the rotation angle β is different from the initial rotation angle β.

The present invention also comprises a process of retrofitting an existing omnidirectional vehicle 1 and piloting said retrofitted omnidirectional vehicle 1 according to the piloting process described here. The retrofitting process includes in particular the step of incorporating to the omnidirectional vehicle 1 a path following unit 7, wherein the path following unit 7 is adapted to generate a virtual sensor V and to dynamically adjust the virtual sensor V so as to provide a travelling direction DA defining a rotation angle β with a reference line 13 of the retrofitted vehicle 1.

What is claimed is:

1. A process of piloting an omnidirectional autonomous vehicle from a first position to a second position on a virtual pathway comprising a virtual path in a workspace, the omnidirectional autonomous vehicle comprising at least one reference line formed by a vehicle centre and a reference point, and steering wheels configurable to drive the omnidirectional autonomous vehicle in the direction of the virtual path independently of its spatial orientation, the process comprising the steps of:
    determining the virtual path said omnidirectional autonomous vehicle should follow;
    configuring the steering wheels of the omnidirectional autonomous vehicle so as to drive the omnidirectional vehicle on the virtual path;
    driving the omnidirectional autonomous vehicle along the virtual path;
    determining a virtual sensor, the position of which being adjustable with regard to the reference line; and
    adjusting said virtual sensor so as to provide a travelling direction forming a rotation angle with the reference line of the omnidirectional autonomous vehicle, the travelling direction being oriented to the virtual path, the adjusted position of said virtual sensor defining the spatial orientation of said omnidirectional autonomous vehicle.

2. The process according to claim 1, wherein step of driving the omnidirectional vehicle along the virtual path, includes a step of dynamically monitoring and correcting the position of the omnidirectional autonomous vehicle and a step of dynamically monitoring and correcting the orientation of the omnidirectional vehicle.

3. The process according to claim 2, wherein the step of dynamically monitoring and correcting the position of the omnidirectional vehicle comprises dynamically determining an offset with regard to the virtual path the omnidirectional vehicle follows and configuring the one or more steering wheels to minimize said offset.

4. The process according to claim 2, wherein the step of dynamically monitoring and correcting the position of the omnidirectional autonomous vehicle comprises dynamically determining an angular offset of the rotation angle and configuring the one or more steering wheels to minimize said angular offset.

5. The process according to claim 1, further comprising a step of determining whether the orientation of the omnidirectional autonomous vehicle should be correlated to the virtual path, correlated to an environmental workspace, or independently controlled.

6. The process according to claim 5, wherein, if the orientation of the omnidirectional autonomous vehicle is determined to be correlated to the environmental workspace, applying a step of dynamically adjusting the rotation angle along the virtual path in a way that the orientation of the omnidirectional autonomous vehicle with regard to the environmental workspace remains constant.

7. The process according to claim 5, wherein, if the orientation of the omnidirectional autonomous vehicle is determined to be correlated to the virtual path, applying a step of maintaining the rotation angle at a constant value along the virtual path in a way that the orientation of omnidirectional autonomous vehicle with regard to the virtual path remains constant.

8. The process according to claim 5, wherein, if it is determined that the orientation of the omnidirectional autonomous vehicle should be independently controlled, applying a step of independently adjusting the rotation angle, wherein the rotation angle is progressively adjusted while the steering wheels are progressively configured to maintain the travelling of the omnidirectional vehicle along the virtual path, or wherein the omnidirectional vehicle is temporally stopped before a modified rotation angle is determined.

9. The process according to claim 1, wherein the step of determining the virtual path comprises defining one or more operation positions wherein the omnidirectional autonomous vehicle receives instructions.

10. The process according to claim 9, wherein the instructions received by the omnidirectional autonomous vehicle comprises the adjustment of the virtual sensor with regard to the vehicle centre.

11. An omnidirectional autonomous vehicle comprising:
- steering wheels configured to drive said omnidirectional autonomous vehicle along a given virtual path independently of its spatial orientation, said steering wheels being driven by a driving unit;
- at least one sensor;
- a positioning unit adapted to determine the position of said omnidirectional autonomous vehicle, said positioning unit being connected to said at least one sensor; and
- a path following unit adapted to store predetermined pathways comprising virtual paths or parts of virtual paths, said path following unit being connected to said positioning unit so as to receive information therefrom to drive the omnidirectional vehicle along a predetermined pathway, the path following unit being configured to:
  - generate a virtual sensor indicating the direction on a virtual path that the omnidirectional vehicle should follow, and
  - send signals to the driving unit so as to pilot the steering wheels according to the virtual path of the omnidirectional vehicle, wherein the omnidirectional autonomous vehicle comprises a reference point and a vehicle centre, the reference point and the vehicle centre defining together a reference line extending therebetween, and wherein said path following unit is further configured to adjust a rotation angle of said virtual sensor with regard to the reference line, said rotation angle being between 0° and 360°, so as to dynamically control the orientation of the omnidirectional vehicle.

* * * * *